(12) United States Patent
Shoarinejad et al.

(10) Patent No.: US 7,623,606 B2
(45) Date of Patent: Nov. 24, 2009

(54) DECODING OF BI-PHASE ENCODED DATA

(75) Inventors: Kambiz Shoarinejad, Los Angeles, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 11/340,243

(22) Filed: Jan. 26, 2006

(65) Prior Publication Data

US 2007/0172007 A1    Jul. 26, 2007

(51) Int. Cl.
*H04L 7/00* (2006.01)
(52) U.S. Cl. .................. 375/354; 375/316; 375/340; 375/341
(58) Field of Classification Search .............. 375/354, 375/340, 341, 316
See application file for complete search history.

(56) References Cited

U.S. PATENT DOCUMENTS

| 5,453,603 A | * | 9/1995 | Russell et al. ............. 235/449 |
| 6,175,908 B1 | * | 1/2001 | Pickett .................. 712/204 |
| 6,618,436 B2 | * | 9/2003 | Greiss et al. ............. 375/229 |

* cited by examiner

*Primary Examiner*—Ted M Wang
(74) *Attorney, Agent, or Firm*—Garlick Harrison & Markison; Timothy W. Markison

(57) ABSTRACT

A method for decoding bi-phase encoded data begins by interpreting a first bit boundary of a bit of the bi-phase encoded data to produce a first boundary value. The method continues by interpreting a second bit boundary of the bit of the bi-phase encoded data to produce a second boundary value. The method continues by comparing the first boundary value to the second boundary value to produce a decoded bit.

13 Claims, 10 Drawing Sheets

DECODING OF BI-PHASE ENCODED DATA

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention related generally to digital signal processing and more particularly to encoding and decoding of data.

2. Description of Related Art

As is known, some radio frequency identification (RFID) applications utilize FM0 and/or FM1 encoding/decoding schemes, which are both bi-phase encoding schemes. FM0 and FM1 bi-phase encoding have a state transition at every bit boundary. For FM0 a logic one is represented as a single state from bit boundary to bit boundary and a logic zero is represented as two states from bit boundary to bit boundary with one transition in the middle of the bit. For example, if the state of the previous encoded bit is −1 at the beginning of the data clock cycle for the present encoded bit, then, for a logic one, the state transitions to +1 and is maintained for the duration of the data clock cycle. If, however, the state of the previous encoded bit is +1 at the beginning of the data clock cycle for the present encoded bit, then, for a logic one, the state is transitioned to −1, which is maintained for the duration of the data clock cycle.

Continuing with the above example, if the state of the previous encoded bit is −1 at the beginning of the data clock cycle for the present encoded bit, then, for a logic zero, the state transitions twice during the data clock cycle: from −1 to +1 and then from +1 to −1. If, however, the state of the previous encoded bit is +1 at the beginning of the data clock cycle for the present encoded bit, then, for a logic zero, the state transitions twice during the data clock cycle: from +1 to −1 and then from −1 to +1. FM1 functions in a similar manner, but represents a logic zero with a single state from bit boundary to bit boundary and a logic one with a two states from bit boundary to bit boundary with one transition in the middle of the bit.

Conventional FM0 and FM1 decoders are bit by bit decoders that include a pair of matched filters, a data slicer, and an absolute value comparator. A first matched filter of the pair of matched filters has a filter response that corresponds to a single state transition and the second matched filter has a filter response that corresponds to a double state transition. The data slicer receives the outputs of the matched filters and produces a digital value representation thereof. The absolute value comparator compares the digital value representations to determine whether the encoded data represents a logic one or a logic zero.

As is generally accepted in the art of encoding/decoding, bit error rate (BER) is a function of signal to noise ratio and the encoding process. For FM0 and FM1 decoders, the encoding process is achieved by encoding a bit as either a single state within a data clock cycle or a dual state within a data clock cycle. Thus, from bit to bit, the resulting encoded value will be different. As is also generally accepted, the difference between encoded values can be measured using a Hamming distance (i.e., the number of bits that differ from encoded word to encoded word). A decoder's sensitivity (i.e., ability to accurately decode encoded data as the signal to noise ratio decreases) is a function of a minimum Hamming distance (i.e., the minimum number of bits that differ from any encoded word to any other encoded word), which for conventional FM0 and FM1 decoders is one. As such, for decoders, include FM0 and FM1 decoders, the BER is a function of the signal to noise ratio and the minimum Hamming distance.

Therefore, a need exists for a method and apparatus of decoding bi-phase encoded data that improves bit error rate relative to signal to noise ratio performance.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
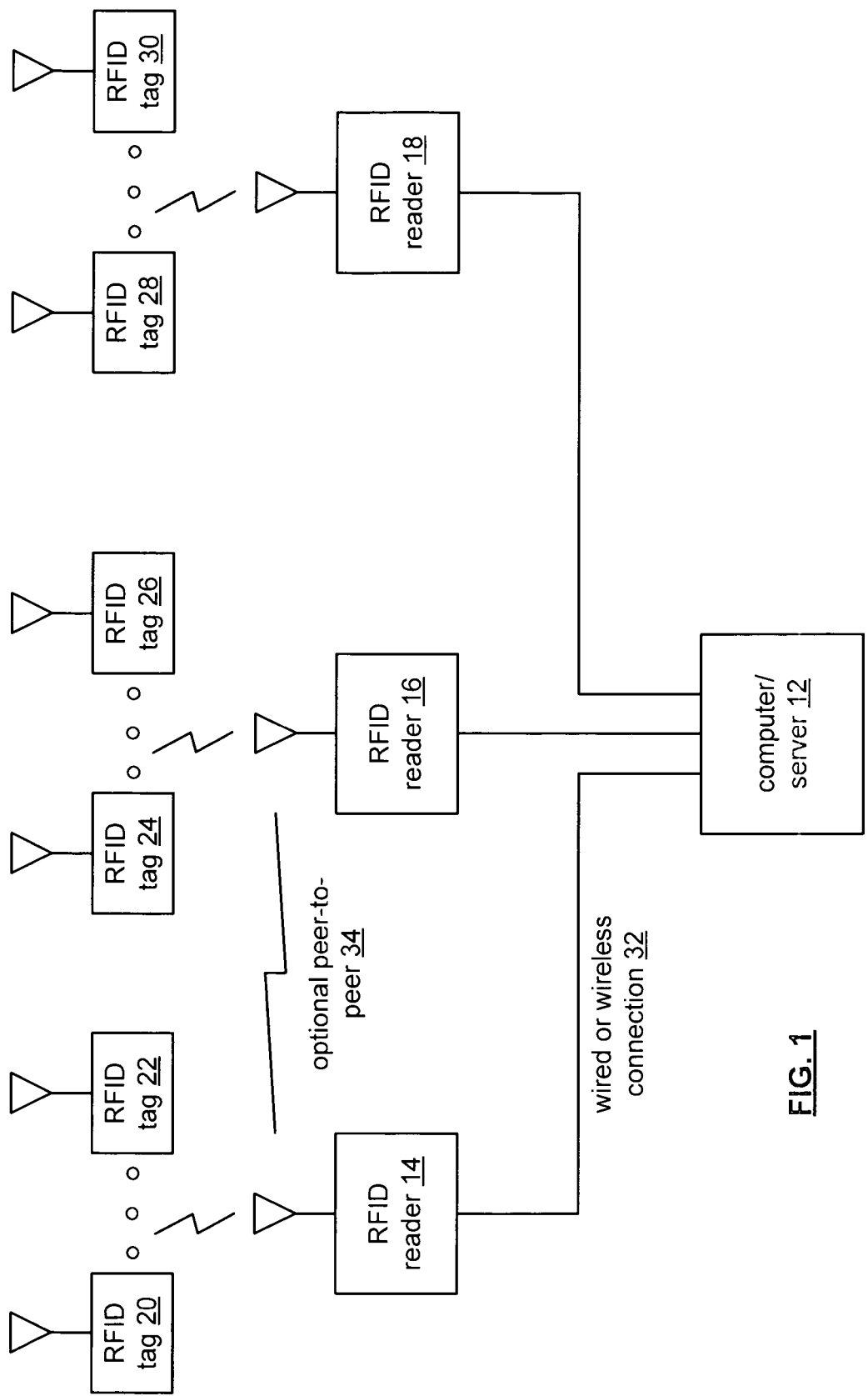
FIG. 1 is a schematic block diagram of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26, and RFID reader 18 has RFID tags 28 and 30 within its coverage area. The RF communication scheme between the RFID readers 14-18 and RFID tags 20-30 may be a back scatter technique whereby the RFID readers 14-18 provide energy to the RFID tags via an RF signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage.

Figure 2:
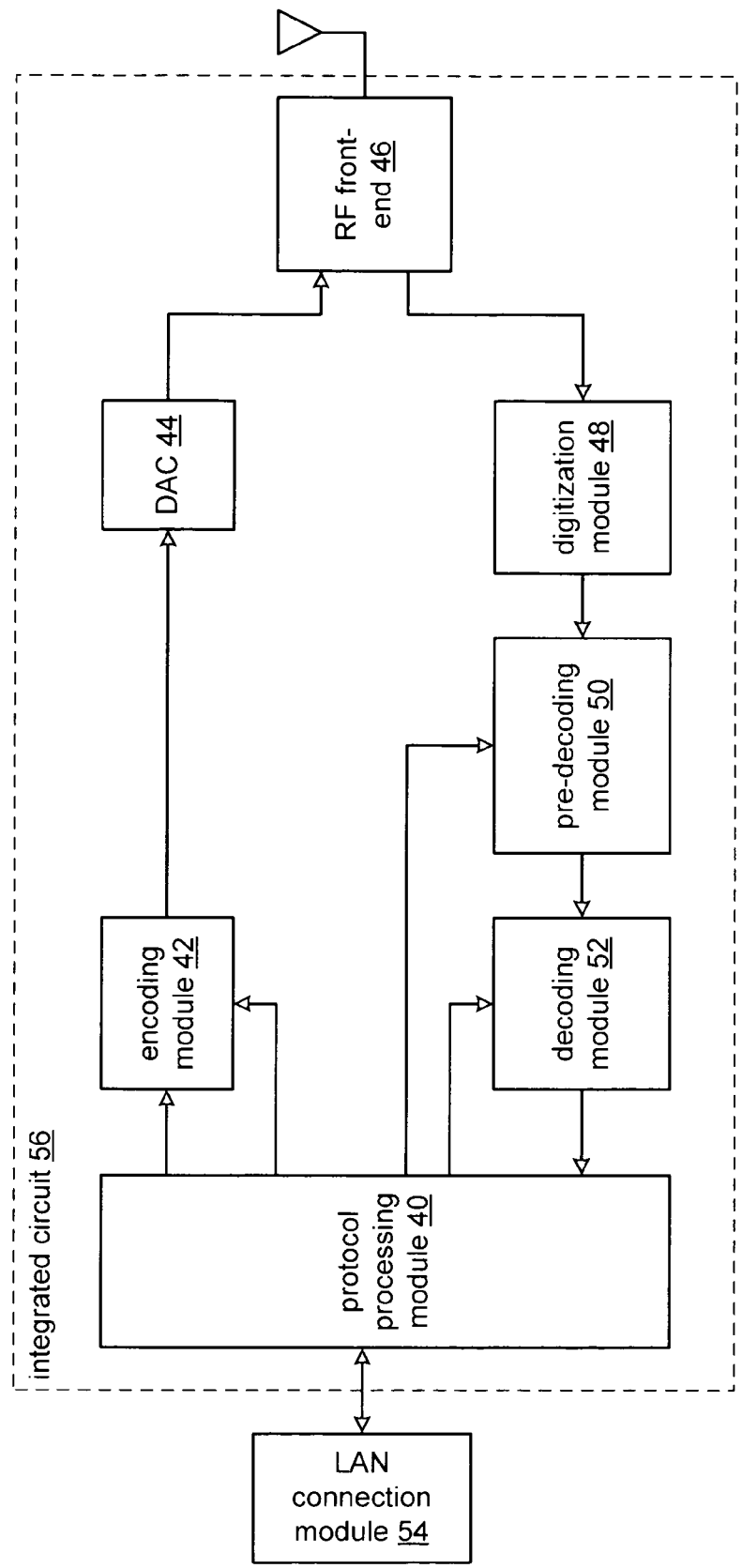
FIG. 2 is a schematic block diagram of an RFID reader in accordance with the present invention.

FIG. 2 is a schematic block diagram of an RFID reader 14-18 that includes an integrated circuit 56 and may further include a local area network (LAN) connection module 54. The integrated circuit 56 includes protocol processing module 40, an encoding module 42, a digital-to-analog converter (DAC) 44, an RF front-end 46, digitization module 48, predecoding module 50 and a decoding module 52. The local area network connection module 54 may include one or more of a wireless network interface (e.g., 802.11n.x, Bluetooth, et cetera) and/or a wired communication interface (e.g., Ethernet, fire wire, et cetera).

The protocol processing module 40 is operably coupled to prepare data for encoding via the encoding module 42 which may perform a data encoding in accordance with one or more RFID standardized protocols. The encoded data is provided to the digital-to-analog converter 44 which converts the digitally encoded data into an analog signal. The RF front-end 46 modulates the analog signal to produce an RF signal at a particular carrier frequency.

The RF front-end 46 includes transmit blocking capabilities such that the energy of the transmit signal does not substantially interfere with the receiving of a back scattered RF signal received from one or more RFID tags. The RF front-end 46 converts the received RF signal into a baseband signal. The digitization module 48, which may be a limiting module or an analog-to-digital converter, converts the received baseband signal into a digital signal. The predecoding module 50 converts the digital signal into a biphase encoded signal in accordance with the particular RFID protocol being utilized. The biphase encoded data is provided to the decoding module 52, which recaptures data therefrom in accordance with the particular encoding scheme of the selected RFID protocol. The protocol processing module 40 provides the recovered data to the server and/or computer via the local area network connection module 54. As one of ordinary skill in the art will appreciate, the RFID protocols include one or more of line encoding schemes such as Manchester encoding, FM0 encoding, FM1 encoding, etc.

Figure 3:
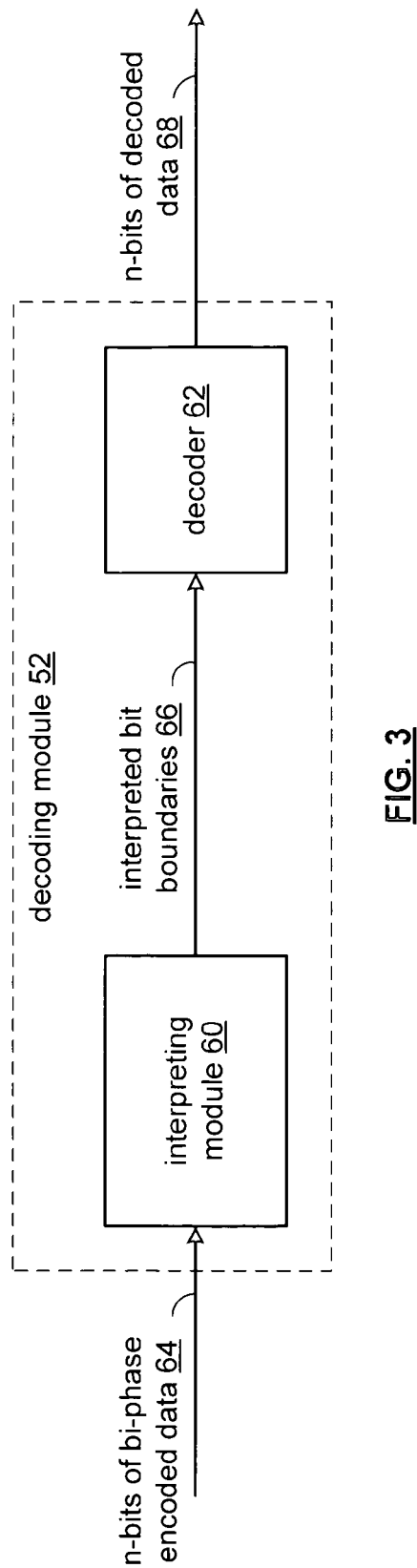
FIG. 3 is a schematic block diagram of a decoding module in accordance with the present invention.

FIG. 3 is a schematic block diagram of the decoding module 52 that includes an interpreting module 60 and a decoder 62. As one of ordinary skill in the art will appreciate, the decoding module 52 may be used in any circuit or system that utilizes a line encoding scheme. In this embodiment, the interpreting module 60 is operably coupled to receive n-bits of biphase encoded data 64, where n=>1. In addition, the interpreting module 60 may receive the n-bits of biphase encoded data 64 in a serial fashion, a parallel fashion, or a serial-parallel fashion.

In one embodiment, the interpreting module is operably coupled to interpret n-current bits of bi-phase encoded data to produce n-interpreted current bits; interpret a portion of a previous bit of the bi-phase encoded data to produce an interpreted previous bit portion: and interpret a portion of a subsequent bit of the bi-phase encoded data to produce an interpreted subsequent bit portion. The decoding module is operably coupled to decode the n-current bits based on the n-interpreted current bits, the interpreted preceding bit portion, and the interpreted subsequent bit portion to produce n-decoded bits.

For example, the interpreting module 60 interprets the n-bits of biphase encoded data 64 to produce interpreted bit boundaries 60. The interpretation, which will be described in greater detail with reference to FIGS. 4-11, includes sampling the biphase encoded data 64 at a rate greater than the bit rate of the encoded data 64. The decoder 62 decodes the interpreted bit boundaries 66, in accordance with the particular encoding scheme, to produce n-bits of decoded data 68, where n=>1. The function of decoder 62 will be described in greater detail with reference to one or more of FIGS. 4-11.

As another example, the interpreting module 60 may interpret the portion of the previous bit, the current bit, and the portion of the subsequent bit by comparing the portion of the previous bit, the current bit, and the portion of the subsequent bit with a plurality of code patterns. Such a comparison may be done by matched filters, a correlation function, etc. The decoder 62 decodes the current bit based on the one of the plurality of code patterns to produce the decoded bit when the portion of the previous bit, the current bit, and the portion of the subsequent bit compares favorably with one of the plurality of code patterns (e.g. the matched filter providing a desired response or the desired correlation).

Figure 4:
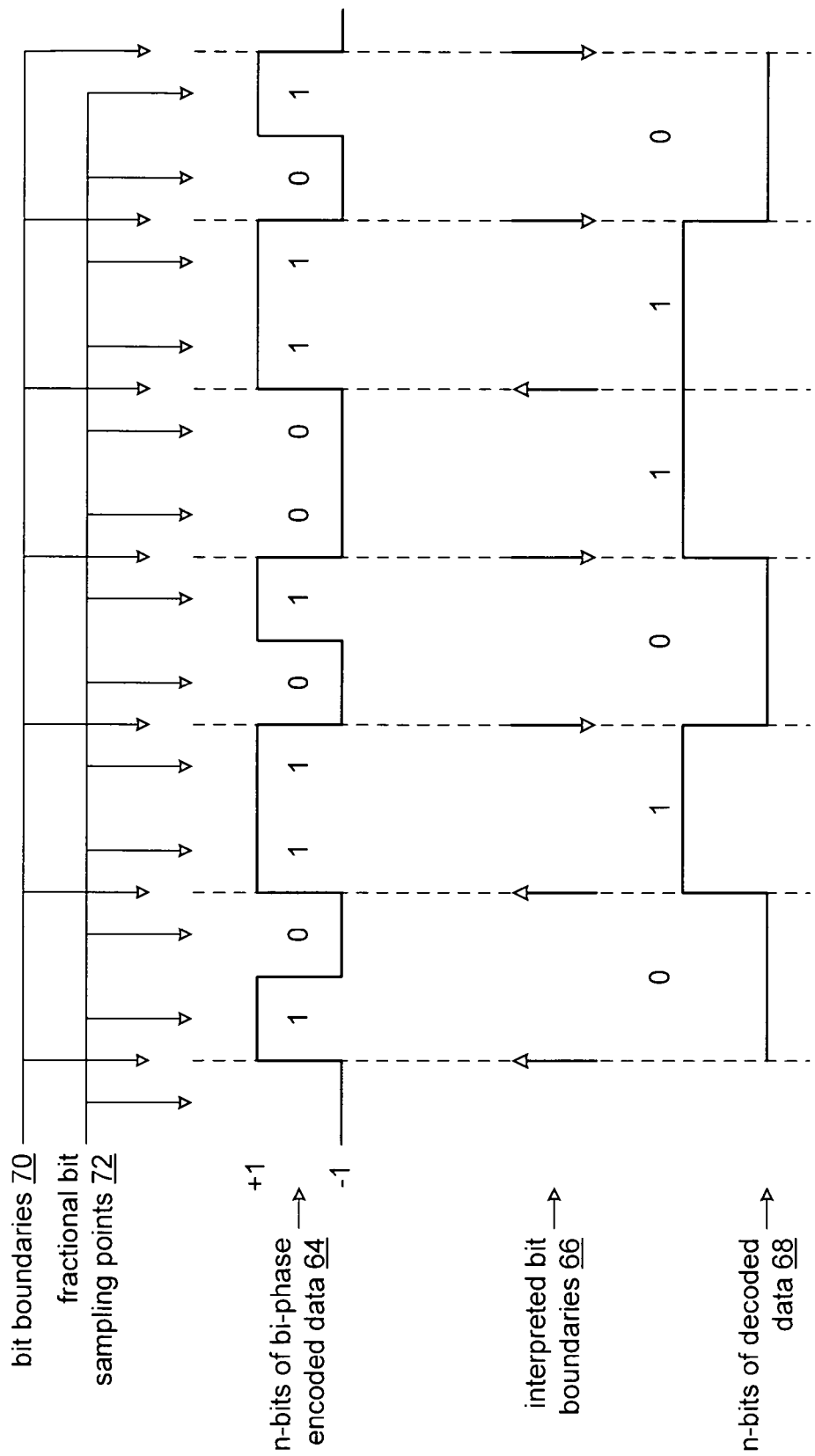
FIG. 4 is a diagram illustrating an example of functionality of the decoding module of FIG. 3.

FIG. 4 is a diagram illustrating an example of the operation of the decoding module 52 of FIG. 3. In this illustration, the n-bits of biphase encoded data 64 are represented as FM0 encoded data where a logic 0 is represented by two states within a data clock cycle and a logic 1 is represented by a single state within the data clock cycle. As shown, the n-bits of biphase encoded data 64 include a serial bit stream of an encoded 0, encoded 1, encoded 0, encoded 1, encoded 1 and an encoded 0. The corresponding bit boundaries 70 of each of the encoded bits are represented by the dashed lines.

The interpretation module 60 samples the n-bits of biphase encoded data 64 in accordance with the fractional bit sampling points 72. As such, for each encoded bit, the interpreting module produces two samples. As one of ordinary skill in the art will appreciate, more than two samples per bit may be used. The interpreting module then utilizes the second sample of the preceding bit and the $1^{st}$ sample of the current bit to produce a bit boundary for the $1^{st}$ edge of the present bit. For example, for the $1^{st}$ bit of encoded data the $2^{nd}$ fractional sample of the preceding bit is a −1 and the $1^{st}$ fractional sample of the current bit is +1. Based on this information, the interpreted bit boundary 66 is represented as a positive value (i.e., transitioning from a −1 to a +1). For the $2^{nd}$ bit boundary of the $1^{st}$ full bit, the $2^{nd}$ fractional sample of the $1^{st}$ bit is compared with the $1^{st}$ fractional sample of the subsequent bit. In this example, the $2^{nd}$ fractional sample of the current bit is −1 and the $1^{st}$ fractional sample of the subsequent bit is +1. For this particular bit boundary, the states transition from a −1 to a +1 thus, the interpreted bit boundary 66 is shown as a positive value. The decoder interprets the $1^{st}$ bit boundary and the $2^{nd}$ bit boundary for the current bit to decode the value. In this instance since both interpreted bit boundary 66 for the $1^{st}$ bit are in the same direction, the decoder decodes this to be a logic 0. Thus, the $1^{st}$ bit of the n-bits of decoded data 68 is a logic 0.

For the next bit of the biphase encoded data 64, the $1^{st}$ transition edge has already been determined, which corresponds to the $2^{nd}$ bit boundary of the $1^{st}$ bit. The $2^{nd}$ bit boundary of the $2^{nd}$ bit is interpreted by the $2^{nd}$ fractional sample of the current bit with the $1^{st}$ fractional sample of the subsequent bit. In this example, the $2^{nd}$ fractional sample of the current bit is +1 and the $1^{st}$ fractional sample of the subsequent bit is −1. In this instance, the interpreted bit boundary 66 is transitioning from a +1 to a −1 and is represented by a down arrow.

For the $2^{nd}$ bit, the decoder interprets the bit boundaries for the $2^{nd}$ bit (an up arrow and a down arrow). Since the direction of the interpreted bit boundary 66 is different, the decoder interprets this as a logic 1. Thus, the $2^{nd}$ bit of the n-bits of decoded data 68 is a logic 1.

Continuing on with the example of FIG. 4, the $3^{rd}$ encoded bit of the biphase encoded data has a $1^{st}$ bit boundary as previously determined as the $2^{nd}$ bit boundary of the $2^{nd}$ bit. Thus, only the $2^{nd}$ bit boundary of the $3^{rd}$ bit needs to be determined. To determine this bit boundary, the $2^{nd}$ fractional sample of the current bit is compared with the $1^{st}$ fractional sample of the subsequent or $4^{th}$ bit. In this example, the $2^{nd}$ fractional sample of the $3^{rd}$, or current bit, is +1 and the $1^{st}$ fractional sample of the subsequent, or $4^{th}$ bit, is −1. Thus, the interpreted bit boundary 66 is from +1 to −1, which is represented by a down arrow. The decoder interprets the bit boundaries for the $3^{rd}$ bit, which both have down arrows, which represent transitions from +1 to −1 as being a logic 0 since the direction of the interpreted bit boundary 66 is in the same direction.

The $4^{th}$ bit is interpreted by determining the $2^{nd}$ bit boundary via the $2^{nd}$ fractional sample of the $4^{st}$ bit in comparison with the $1^{st}$ fractional sample of the $5^{th}$ bit. In this example, the $2^{nd}$ bit boundary of the $4^{th}$ bit is transitioning from a −1 to a +1, which is represented as an up arrow in the interpreted bit boundary 66. For the $4^{th}$ bit, the decoder compares the interpreted bit boundary 66 and determines that they are in opposite directions. As such, the current bit is decoded as a logic 1.

Thus, in one embodiment, the decoder interprets the bit boundaries utilizing the fractional samples of the previous, current, and subsequent bits to determine whether the bit boundaries are in the same direction or opposite direction. When in the same direction, the data is decoded as a logic 0 and when in the opposite direction the data is encoded as a logic 1. Note that for FM1 encoded data the opposite would be true. For example, for FM1 encoding, if the interpreted bit boundaries are in the same direction, a logic 1 would be decoded and if the interpreted bit boundaries are in opposite directions, a logic 0 would be decoded. Further note that the voltage swing of the bi-phase encoded data 64 is not limited to a +1 to −1, but, for example, may be from 0 to +1, −1 to 0, etc.

In another embodiment, the interpreting module 60 may interpret the portion of the previous bit, the current bit, and the portion of the subsequent bit by comparing the portion of the previous bit, the current bit, and the portion of the subsequent bit with a plurality of code patterns. For example, for a given encoded bit, the previous bit portion may be a logic zero or a logic one, the current encoded bit portion may be, 00, 01, 10, or 11, and the subsequent bit portion may be a logic zero or a logic one. Thus, for the current encoded bit portion, the possible code patterns are 0101, 0110, 1010, or 1001. By using a plurality of matched filters, or correlation functions, the code pattern for the current encoded bit of the portion of the previous encoded bit, the current encoded bit, and the portion of subsequent encoded bit may be identified. Once the code pattern is identified, the decoder 62 may readily decode the current encoded bit.

Figure 5:
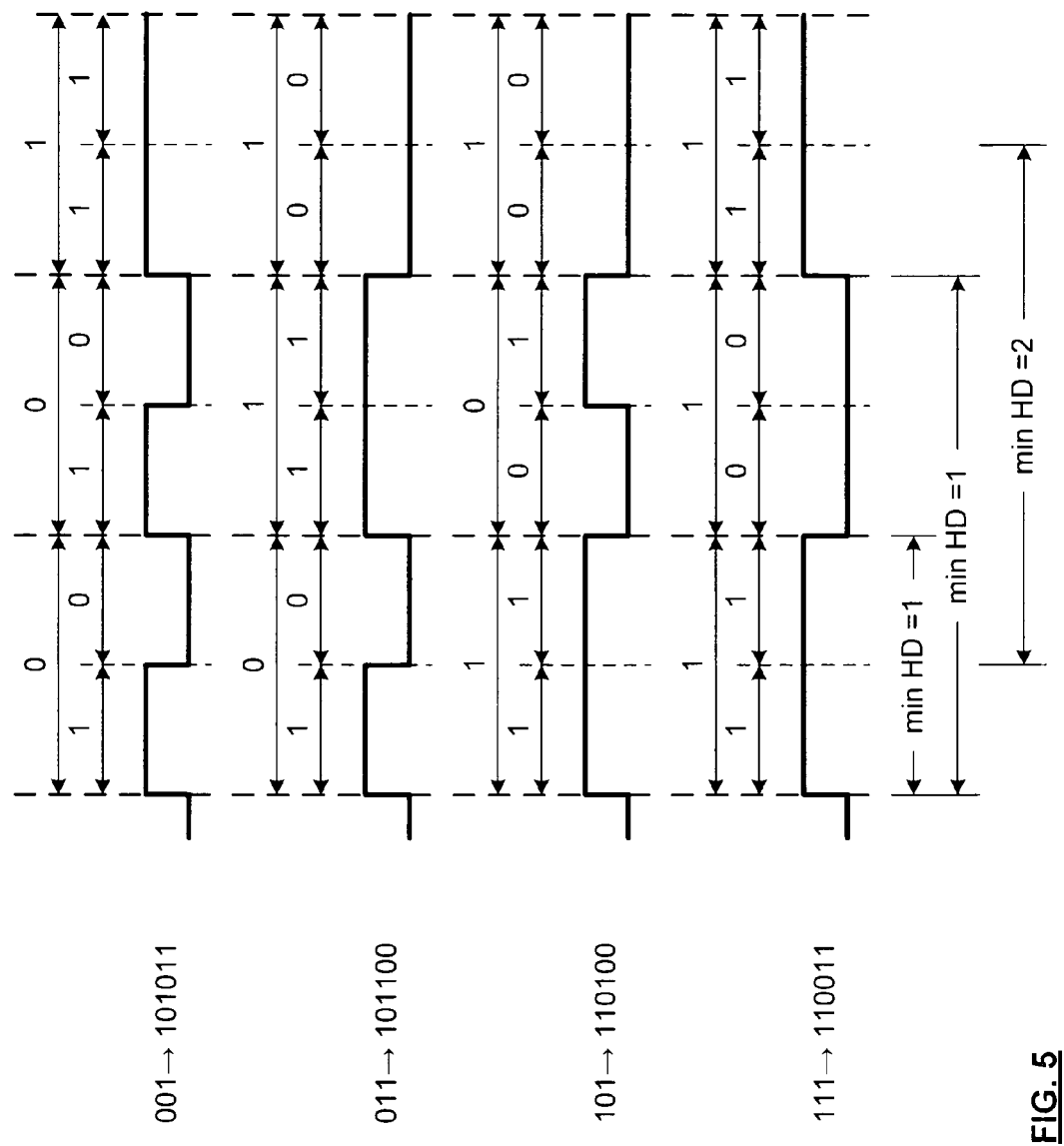
FIG. 5 is a diagram illustrating bi-phase encoded data represented as code words in accordance with the present invention.

FIG. 5 is a diagram illustrating four different combinations of three bits of bi-phase encoded data. The first combination includes three bits of 001, which is encoded as 101011; the second combination includes three bits of 011, which is encoded as 101100; the third combination includes three bits of 101, which is encoded as 110100; and the fourth combination includes three bits of 111, which is encoded as 110011. Thus, for this example, the resulting code words are 101011, 101100, 110100, and 110011.

For conventional FM0 and FM1 decoders, which decode the encoded biphase data using one or more data clock cycles (where one data clock cycle is the interval from one thick dashed line to the next), a minimum Hamming distance of 1 is obtained. In contrast, a decoder in accordance with the present invention decodes the biphase encoded data over an interval that include a fraction of a data clock cycle of a previous encode bit and a fraction of a data clock cycle of a subsequent encoded bit to decode one or more current encoded bits. As shown, by decoding at fractional data clock cycles, the minimum Hamming distance is two. Thus, a decoder in accordance with the present invention provides at least a 3 dB improvement in BER since it has twice the minimum Hamming distance as conventional decoders.

Figure 6:
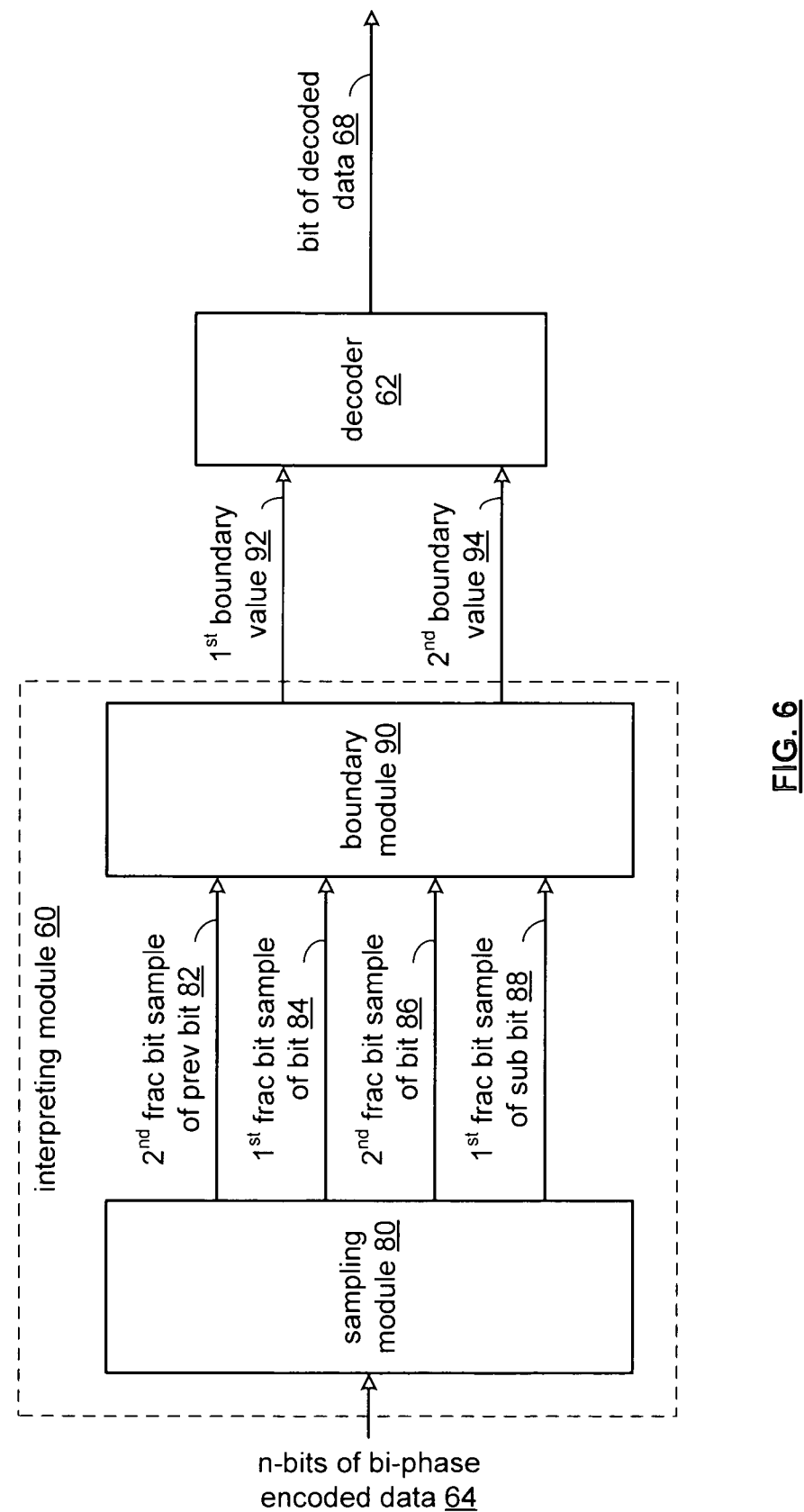
FIG. 6 is a schematic block diagram of an embodiment of a decoding module in accordance with the present invention.

FIG. 6 is a schematic block diagram of an embodiment of the decoding module 52 that includes the interpreting module 60 and the decoder 62. In this embodiment, the interpreting module 60 includes a sampling module 80 and a boundary module 90.

The sampling module 80 is operably coupled to receive the n-bits of biphase encoded data 64. The sampling module 80 generates there from a $2^{nd}$ fractional bit sample of a previous bit 82, a $1^{st}$ fractional bit sample of the current bit 84, a $2^{nd}$ fractional bit sample of the current bit 86 and a $1^{st}$ fractional bit sample of a subsequent bit 88. With reference to the $2^{nd}$ bit of the biphase encoded data of FIG. 4, the $2^{nd}$ fractional bit sample of the previous bit 82 would be a −1, the $1^{st}$ and $2^{nd}$ fractional bit samples of the current bit 84 and 86 would each be +1 and the $1^{st}$ fractional bit sample of a subsequent bit 88 would be −1.

Returning to the discussion of FIG. 6, the bit boundary module 90 compares the $2^{nd}$ fractional bit sample of the previous bit 82 with the $1^{st}$ fractional bit sample of the current bit 84 to produce the $1^{st}$ boundary value 92. The boundary module 90 also compares the $2^{nd}$ fractional bit sample of the current bit 86 with the $1^{st}$ fractional bit sample of the subsequent bit 88 to produce the $2^{nd}$ boundary value 94. Note that the $1^{st}$ and $2^{nd}$ boundary values 92 and 94 correspond to the interpreted bit boundaries 66 of FIG. 4.

The decoder 62 receives the $1^{st}$ and $2^{nd}$ boundary values 92 and 94 and produces therefrom a bit of decoded data 68. With reference again to FIG. 4 and the $2^{nd}$ encoded bit, the $1^{st}$ boundary value 92 may be represented as a +2 (i.e., the $1^{st}$ fractional bit sample of the current bit 84 minus the $2^{nd}$ fractional bit sample of the previous bit 82, which equals 1 minus –1) and the $2^{nd}$ boundary value 94 may be represented by a –2 (i.e., the 15' fractional bit sample of the subsequent bit 88 minus the $2^{nd}$ fractional bit sample of the current bit 86, which for this example is –1–1). Continuing with reference to FIG. 4, the interpreted bit boundary 66 for the $1^{st}$ boundary value 92 of the $2^{nd}$ bit is represented by the up arrow (e.g., +2) while the $2^{nd}$ boundary value 94 of a $2^{nd}$ bit is represented by the down arrow (e.g., –2). The decoder 62 determines that the $1^{st}$ and $2^{nd}$ bit boundaries are not equal thus, interprets the bit to be a logic 1. If, conversely, as for the $3^{rd}$ bit of FIG. 4, the $1^{st}$ and $2^{nd}$ bit boundary values 92 and 94 are equal, the decoder 62 would generate a logic 0 for FM0 encoded data. The opposite would be true for FM1 encoded data.

As one of ordinary skill in the art will appreciate, the decoding module 52 may include multiple interpreting modules 60 and decoders 62 for parallel decoding of the n-bits of biphase encoded data 64. Further, note that the sampling module 80 and boundary module 82 may process the n-bits of biphase encoded data 54 in a serial fashion (i.e., one bit at a time), a parallel fashion (i.e., multiple bits at a time), or serial-parallel fashion (i.e., one bit at a time by multiple decoding modules).

Figure 7:
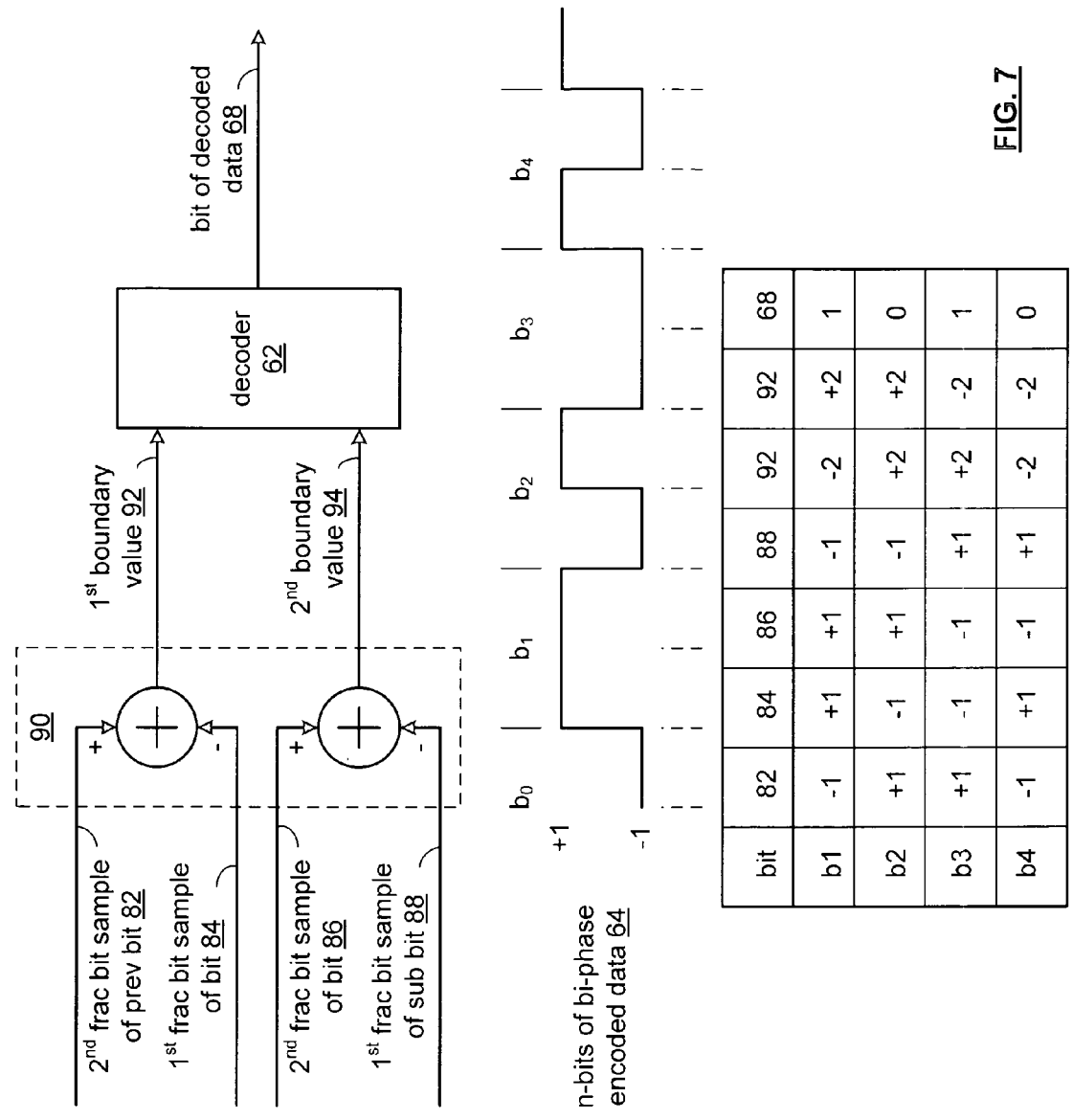
FIG. 7 is a schematic block diagram and an example functional diagram of another embodiment of a decoding module in accordance with the present invention.

FIG. 7 illustrates another embodiment of the decoding module 52 wherein the boundary module 90 includes a pair of subtraction modules. As shown, the $1^{st}$ boundary value 92 is represented by the $1^{st}$ fractional bit sample of the current bit 84 subtracted from the $2^{nd}$ fractional bit sample of the previous bit 82. The $2^{nd}$ boundary value 94 is represented by the st fractional bit sample of the subsequent bit 88 subtracted from the $2^{nd}$ fractional bit sample of the current bit 86. With reference to the corresponding graph and table of FIG. 6, the fractional bit samples are illustrated, the corresponding $1^{st}$ and $2^{nd}$ boundary values 92 and 94 are illustrated and the resulting bits of decoded data 68 is represented. For example, for bit B1 of the n-bits of biphase encoded data, the fractional bit samples are –1, +1, +1, and –1. Based on this data, the $1^{st}$ boundary value 92 is a –2 and the $2^{nd}$ boundary value 94 is a +2. Since the $1^{st}$ and $2^{nd}$ boundary values 92 and 94 are different, the decoder decodes this as a logic 1. For bit B2, the fractional bit samples are +1, –1, +1, and –1 yielding $1^{st}$ and $2^{nd}$ boundary values 92 and 94 of +2. Since the $1^{st}$ and $2^{nd}$ boundary values 92 and 94 are equal, the decoder 62 decodes this as a logic 0.

For bit B3, the fractional samples are +1, –1, –1, and +1 yielding a $1^{st}$ boundary value 92 of +2 and a $2^{nd}$ boundary value 94 of –2. Since the $1^{st}$ and $2^{nd}$ boundary values 92 and 94 are not equal, the decoder 62 decodes this as a logic 1. For bit B4, the fractional bit samples are –1, +1, –1, +1 yielding –2 for the $1^{st}$ and $2^{nd}$ boundary values 92 and 94. Since the $1^{st}$ and $2^{nd}$ boundary values 92 and 94 are equal, the decoder 62 decodes this as a logic 0.

Figure 8:
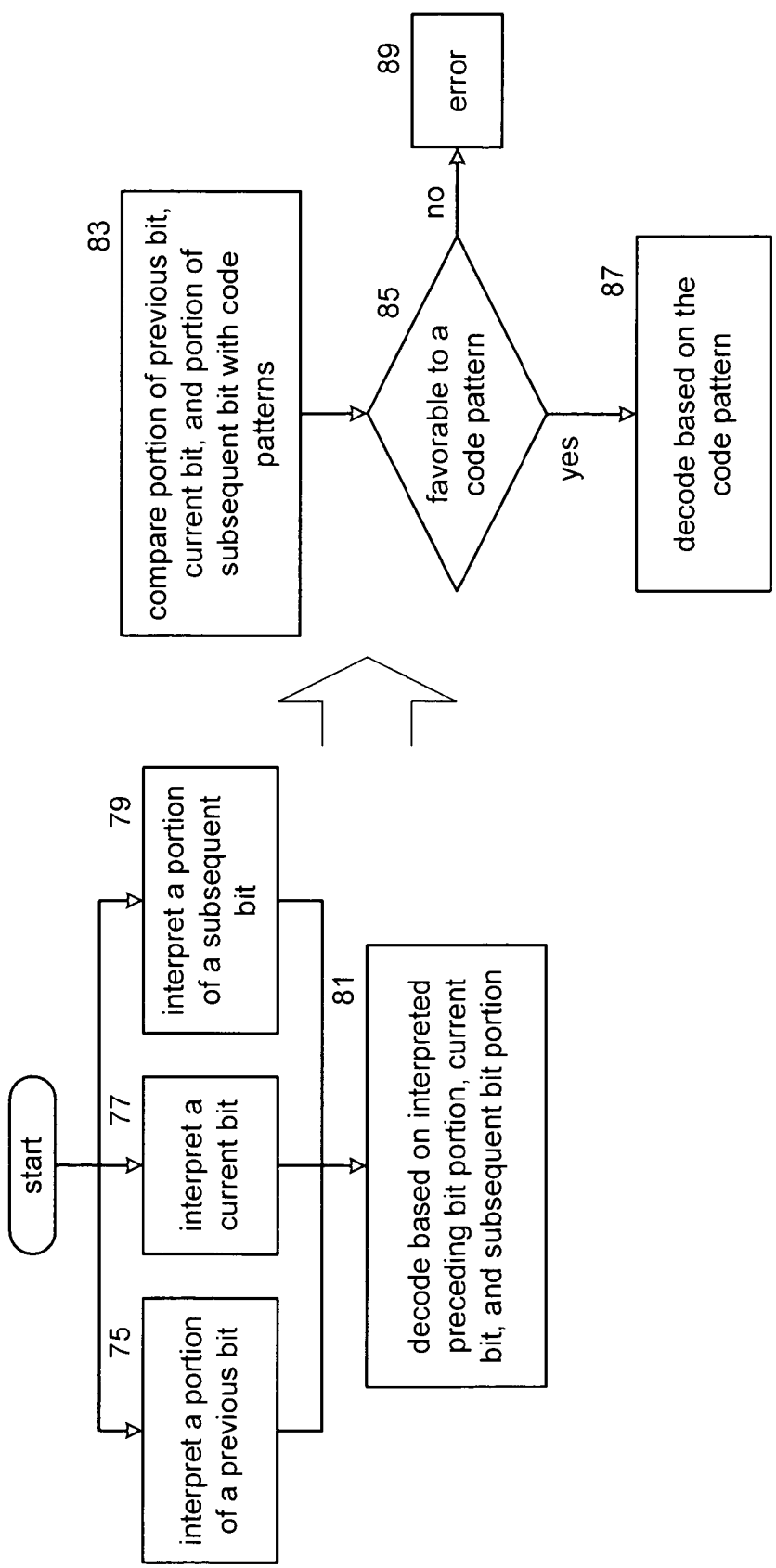
FIG. 8 is a logic diagram of a method for decoding biphase encoded data in accordance with the present invention.

FIG. 8 is a logic diagram of a method for decoding biphase encoded data. The method begins at steps 75, 77, and 79 where a portion of a previous bit of bi-phase encoded data, a current bit of the bi-phase encoded data, and a portion of a subsequent bit of the bi-phase encoded data are interpreted to produce an interpreted previous bit portion, an interpreted current bit, and an interpreted subsequent bit portion, respectively. In one embodiment, the interpreting may be done by comparing the portion of the previous bit, the current bit, and the portion of the subsequent bit with a plurality of code patterns as shown at step 83.

The method then proceeds to step 81, where the current bit is decoded based on the interpreted preceding bit portion, the interpreted current bit, and the interpreted subsequent bit portion to produce a decoded bit. In one embodiment, a determination is made as to whether the comparing of the portion of the previous bit, the current bit, and the portion of the subsequent bit with a plurality of code patterns produced a favorable result (e.g., matched one of the code patterns) as shown at step 85. If a favorable comparison was not reached, the process proceeds to step 89, where an error is generated. If, however, a favorable comparison was reached, the process proceeds to step 87, where the current bit is decoded based on the one of the code patterns that produced the favorable comparison. An example of this was provided with reference to FIGS. 3 and 4.

Figure 9:
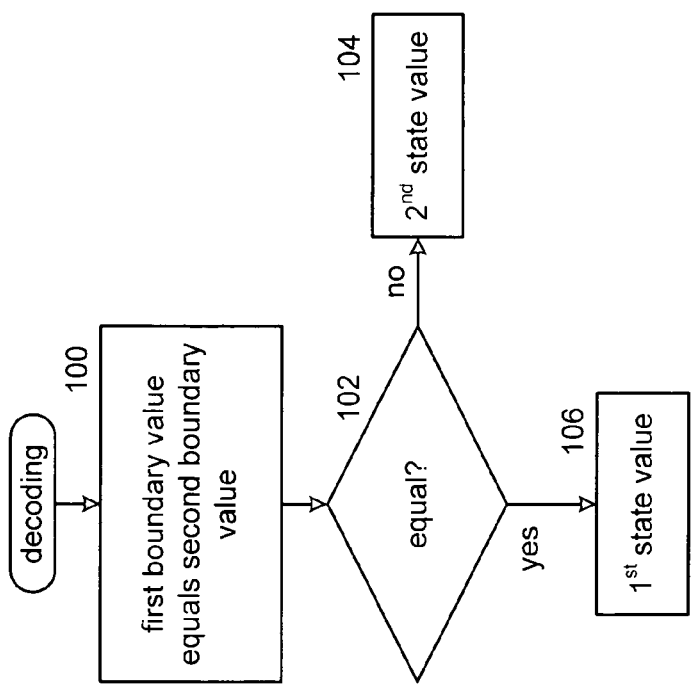
FIG. 9 is a logic diagram of another method for decoding biphase encoded data in accordance with the present invention.

FIG. 9 is a logic diagram of a method that may be utilized by the decoder 62 to decode the bit boundaries. The process begins at Step 100 where a determination is made as to whether the $1^{st}$ boundary value equals the $2^{nd}$ boundary value. If, at Step 102 the values are equal, the process proceeds to Step 106. At Step 106, the decoder decodes the $1^{st}$ and $2^{nd}$ boundary values to be a $1^{st}$ logic state value (for FM0 encoded data this may be a logic 0 and for FM1 encoded data this may be a logic 1).

If the $1^{st}$ and $2^{nd}$ boundary values are not equal as determined in Step 102, the process proceeds to Step 104. At Step 104, the decoder decodes the $1^{st}$ and $2^{nd}$ boundaries to be a $2^{nd}$ state value. For example, the $2^{nd}$ state value may be a logic 1 for FM0 encoded data and a logic 0 for FM1 encoded data.

Figure 10:
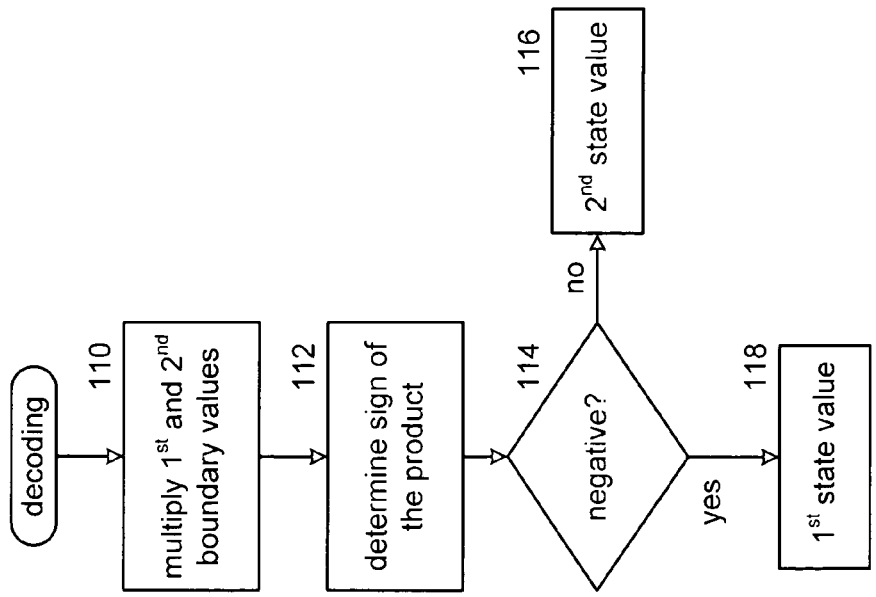
FIG. 10 is a logic diagram of another method for decoding biphase encoded data in accordance with the present invention.

FIG. 10 is another embodiment of a method for decoding that may be performed by decoder 62. The process begins at Step 110 where the $1^{st}$ and $2^{nd}$ boundary values are multiplied to produce a product. The process then proceeds to Step 112 where the sign of the product is determined. If, at Step 114, the sign is negative, the process proceeds to Step 118 where the decoder decodes the $1^{st}$ and $2^{nd}$ boundary values to be a $1^{st}$ state value (e.g. a logic 0 for FM0 encoded data).

If, however, at Step 114 the sign of the product is not negative, the process proceeds to Step 116. At Step 116, the decoder decodes the $1^{st}$ and $2^{nd}$ boundary values as a $2^{nd}$ state value (e.g., a logic 1 for FM0 encoded data).

Figure 11:
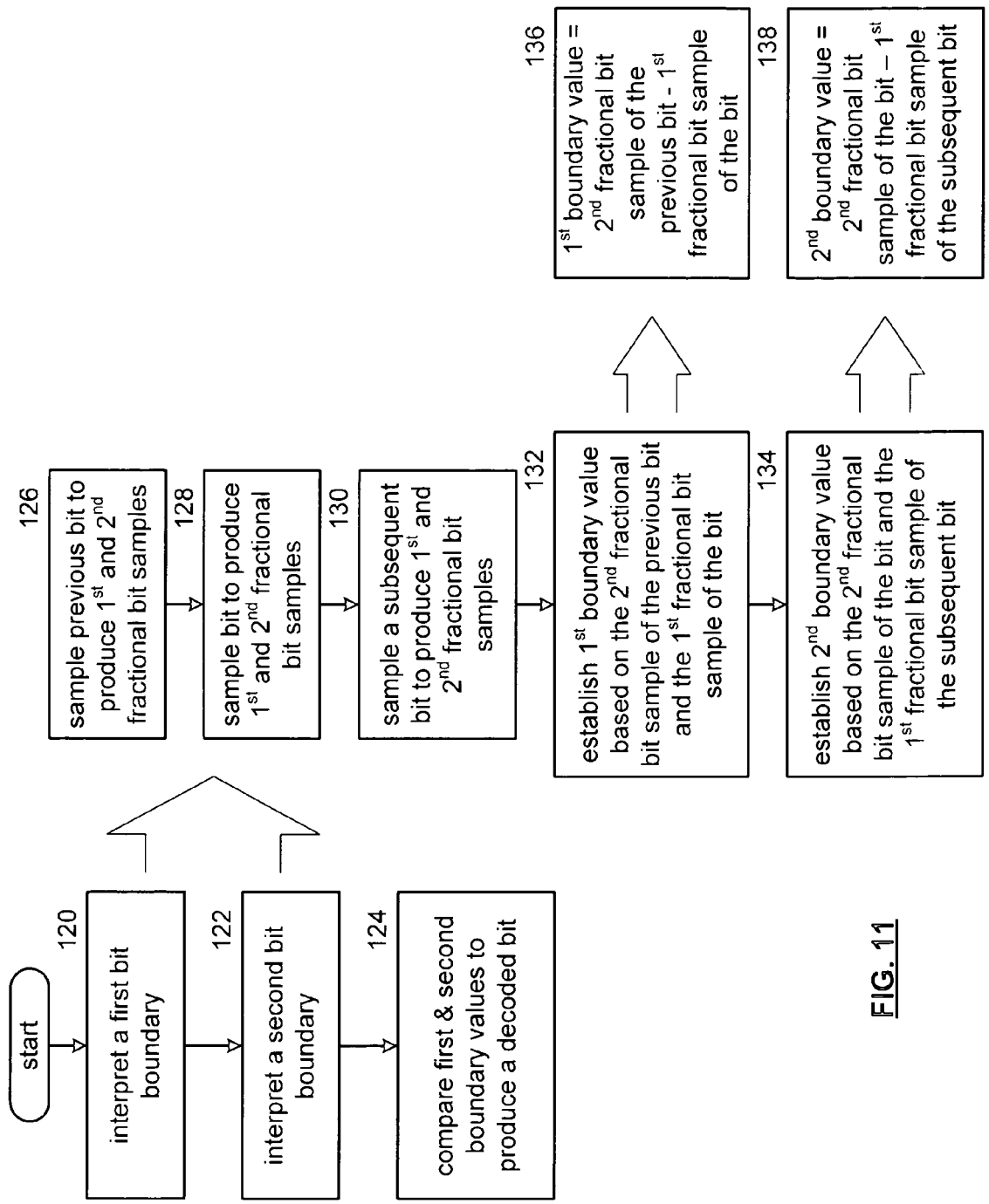
FIG. 11 is a logic diagram of another method for decoding biphase encoded data in accordance with the present invention.

FIG. 11 is a logic diagram of a method for decoding biphase encoded data. The method begins at Step 120 where a $1^{st}$ bit boundary of a bit of biphase encoded data is interpreted to produce a $1^{st}$ bit boundary value. The process then proceeds to Step 122 where a $2^{nd}$ bit boundary of the biphase encoded data is interpreted to produce a $2^{nd}$ boundary value. The process then proceeds to Step 124 where the $1^{st}$ and $2^{nd}$ boundary values are compared to produce a decoded bit.

The steps of interpreting the $1^{st}$ and $2^{nd}$ bit boundaries 120 and 122 may be further described with reference to Steps 126-138. At Step 126, a previous bit is sampled to produce $1^{st}$ and $2^{nd}$ fractional bit samples. The process then proceeds to Step 128 where a current bit is sampled to produce $1^{st}$ and $2^{nd}$ fractional bit samples. The process then proceeds to Step 130 where a subsequent bit is sampled to produce $1^{st}$ and $2^{nd}$ fractional bit samples. The process then proceeds to Step 132 where the $1^{st}$ boundary value is established based on the $2^{nd}$ fractional bit sample of the previous bit and the $1^{st}$ fractional bit sample of the current bit. For example, as shown in Step 136 this may be done by subtracting the $1^{st}$ fractional bit sample of the current bit from the $2^{nd}$ fractional bit sample of the previous bit.

The process then proceeds to Step 134 where the $2^{nd}$ boundary value is established based on the $2^{nd}$ fractional bit sample of the current bit and the $1^{st}$ fractional bit sample of the subsequent bit. For example, as shown in Step 138, the $1^{st}$ fractional bit sample of the subsequent bit may be subtracted from the $2^{nd}$ fractional bit sample of the current bit to produce the $2^{nd}$ boundary value.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e. where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for decoding biphase encoded data with improved sensitivity. As one of ordinary skill in the art will appreciate, other embodiments may be derived from the teaching of the present invention without deviating from the scope of the claims.

What is claimed is:

1. A decoding module comprises:
    interpreting module operably coupled to:
        interpret n-current bits of bi-phase encoded data to produce n-interpreted current bits;
        interpret a portion of a previous bit of the bi-phase encoded data to produce an interpreted previous bit portion;
        interpret a portion of a subsequent bit of the bi-phase encoded data to produce an interpreted subsequent bit portion; and
    a decoder operably coupled to decode the n-current bits based on the n-interpreted current bits, the interpreted preceding bit portion, and the interpreted subsequent bit portion to produce n-decoded bits.

2. The decoding module of claim 1 further comprises:
    the interpreting module further functions to interpret the portion of the previous bit, the n-current bits, and the portion of the subsequent bit by:
        interpreting n+1 bit boundaries of n-current bits based on the n-interpreted current bits, the interpreted previous bit, and the interpreted subsequent bit to the produce interpreted bit boundaries; and
    the decoder further functions to decode the n-current bits based on the interpreted bit boundaries.

3. The decoding module of claim 2, wherein the interpreting module comprises:
    a sampling module operably coupled to:
        sample the previous bit to produce a second fractional bit sample of the previous bit;
        sample each of the n-current bits to produce a first fractional bit sample for each of the n-current bits and a second fractional bit sample for each of the n-current bits;
        sample the subsequent bit to produce a first fractional bit sample of the subsequent bit; and
    a boundary module operably coupled to:
        for each bit of the n-current bits, establish a first boundary value based on the second fractional bit sample of a preceding encoded bit and the first fractional bit sample of a current encoded bit; and
        establish the second boundary value based on the second fractional bit sample of the current encoded bit and the first fractional bit sample of a succeeding encoded bit.

4. The decoding module of claim 3, wherein the boundary module comprises:
    a first subtraction module for subtracting the first fractional bit sample of the current encoded bit from the second fractional bit sample of the preceding encoded bit to produce the first boundary value; and
    a second subtraction module for subtracting the first fractional bit sample of the succeeding encoded bit from the second fractional bit sample of the current encoded bit to produce the second boundary value.

5. The decoding module of claim 4, wherein, for each of the n-bits, the decoder further functions to decode the n-current bits based on the interpreted bit boundaries by:
    determining whether the first boundary value substantially equals the second boundary value;
    when the first boundary value substantially equals the second boundary value, providing a first state value; and
    when the first boundary value does not substantially equal the second boundary value, providing a second state value.

6. The decoding module of claim 4, wherein, for each of the n-bits, the decoder further functions to decode the n-current bits based on the interpreted bit boundaries by:
    multiplying the first and second boundary values to produce a product;
    determining a sign of the product;
    when the sign is negative, providing a first state value; and
    when the sign is positive, providing a second state value.

7. A radio frequency identification (RFID) reader comprises:
    a radio frequency (RF) front end operably coupled to convert a received RF signal into a near baseband signal;
    a digitizing module operably coupled to convert the near baseband signal into a digital baseband signal;

pre-decoding module operably coupled to convert the digital baseband signal into bi-phase encoded data; and
a decoding module operably coupled to:
  interpret a portion of a previous bit of bi-phase encoded data to produce an interpreted previous bit portion;
  interpret a current bit of the bi-phase encoded data to produce an interpreted current bit;
  interpret a portion of a subsequent bit of the bi-phase encoded data to produce an interpreted subsequent bit portion; and
  decode the current bit based on the interpreted preceding bit portion, the interpreted current bit, and the interpreted subsequent bit portion to produce a decoded bit.

8. The RFID reader of claim 7, wherein the decoding module further functions to:
  interpret the portion of the previous bit, the current bit and the portion of the subsequent bit by:
    interpreting a first bit boundary of the current encoded bit to produce a first boundary value;
    interpreting a second bit boundary of the current encoded bit to produce a second boundary value; and
  decode the current bit by:
    comparing the first boundary value to the second boundary value to produce the decoded bit.

9. The RFID reader of claim 8, wherein the interpreting the first and second bit boundaries comprises:
  sampling the previous bit to produce a first fractional bit sample of the previous bit and a second fractional bit sample of the previous bit;
  sampling the current bit to produce a first fractional bit sample of the bit and a second fractional bit sample of the bit;
  sampling the subsequent bit to produce a first fractional bit sample of the subsequent bit and a second fractional bit sample of the subsequent bit;
  establishing the first boundary value based on the second fractional bit sample of the previous bit and the first fractional bit sample of the bit; and
  establishing the second boundary value based on the second fractional bit sample of the bit and the first fractional bit sample of the subsequent bit.

10. The RFID reader of claim 9, wherein the establishing the first and second boundary values comprises:
  subtracting the first fractional bit sample of the current bit from the second fractional bit sample of the previous bit to produce the first boundary value; and
  subtracting the first fractional bit sample of the subsequent bit from the second fractional bit sample of the current bit to produce the second boundary value.

11. The RFID reader of claim 10, wherein the comparing the first boundary value to the second boundary value comprises:
  determining whether the first boundary value substantially equals the second boundary value;
  when the first boundary value substantially equals the second boundary value, providing the decoded value of the current bit as a first state value; and
  when the first boundary value does not substantially equal the second boundary value, providing the decoded value of the current bit as a second state value.

12. The RFID reader of claim 9, wherein the comparing the first boundary value to the second boundary value comprises:
  multiplying the first and second boundary values to produce a product;
  determining a sign of the product;
  when the sign is negative, providing the decoded value of the current bit as a first state value; and
  when the sign is positive, providing the decoded value of the current bit as a second state value.

13. The RFID reader of claim 7, wherein the decoding module further functions to:
  interpret the portion of the previous bit, the current bit, and the portion of the subsequent bit by:
    comparing the portion of the previous bit, the current bit, and the portion of the subsequent bit with a plurality of code patterns; and
  decode the current bit by:
    when the portion of the previous bit, the current bit, and the portion of the subsequent bit compares favorably with one of the plurality of code patterns, decoding the current bit based on the one of the plurality of code patterns to produce the decoded bit.

* * * * *